Figure 1:
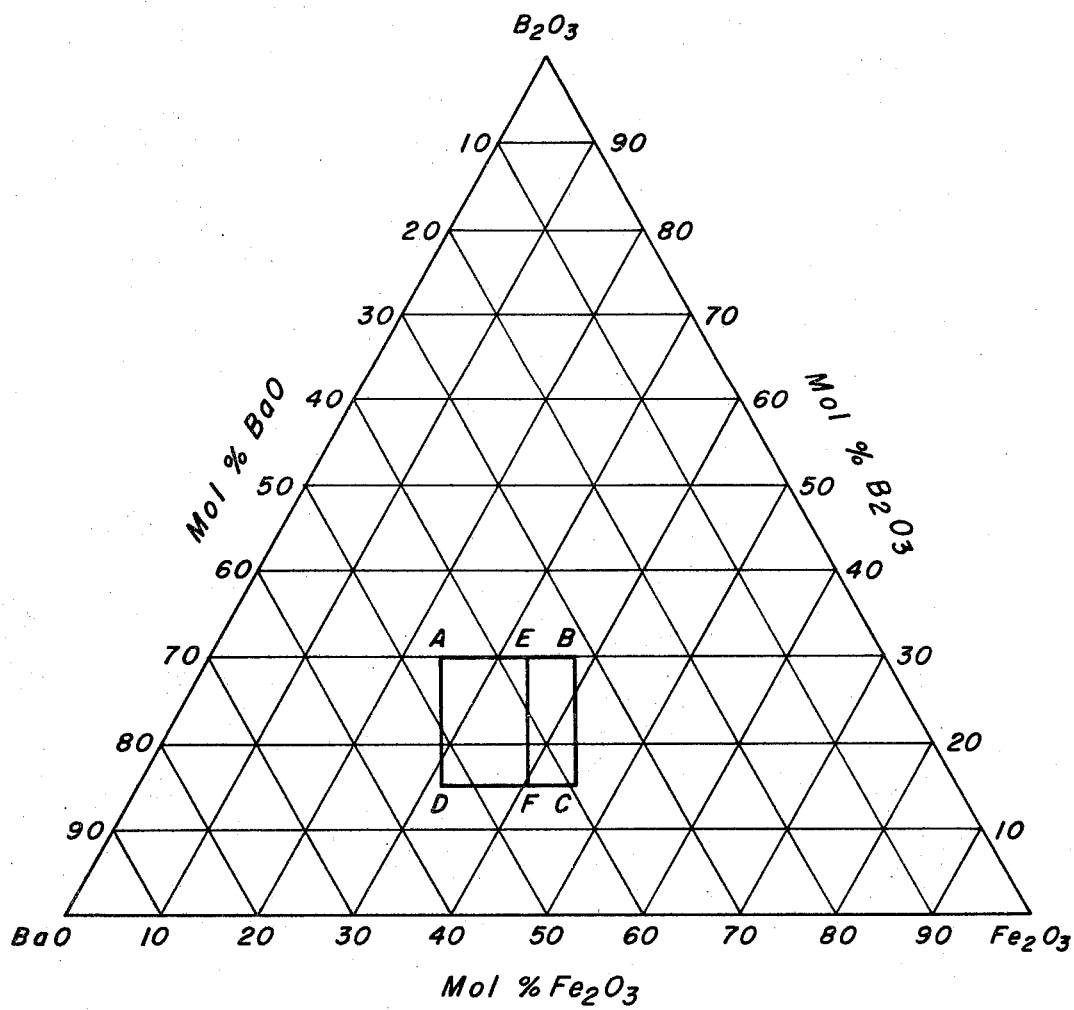

United States Patent

[11] 3,630,667

[72] Inventor Brian Thomas Shirk
St. Marys, Pa.
[21] Appl. No. 812,158
[22] Filed Apr. 1, 1969
[45] Patented Dec. 28, 1971
[73] Assignee Stackpole Carbon Company
St. Marys, Pa.

[54] PRODUCTION OF BARIUM FERRITE
7 Claims, 2 Drawing Figs.
[52] U.S. Cl. .................................. 23/51, 106/47
[51] Int. Cl. .................................. C01g 49/00
[50] Field of Search........................... 23/51; 106/47; 252/62.58, 62.63

[56] References Cited
UNITED STATES PATENTS
3,117,934  1/1964  Linares.......................  23/51
3,258,434  6/1966  Mackenzie et al............  106/47 X
3,384,449  5/1968  Au Coin et al................  23/51

Primary Examiner—Herbert T. Carter
Attorney—Brown, Murray, Flick and Peckham

ABSTRACT: In accordance with this invention barium ferrite hard magnetic materials are produced by quenching a molten homogeneous composition of $B_2O_3$, BaO and $Fe_2O_3$ within the area ABCD of FIG. 1 to form a homogeneous, substantially noncrystalline glass, heating the quenched glass to nucleate and crystallize barium ferrite in a borate-rich matrix, and separating the matrix material from the crystallized barium ferrite.

INVENTOR.
B. THOMAS SHIRK

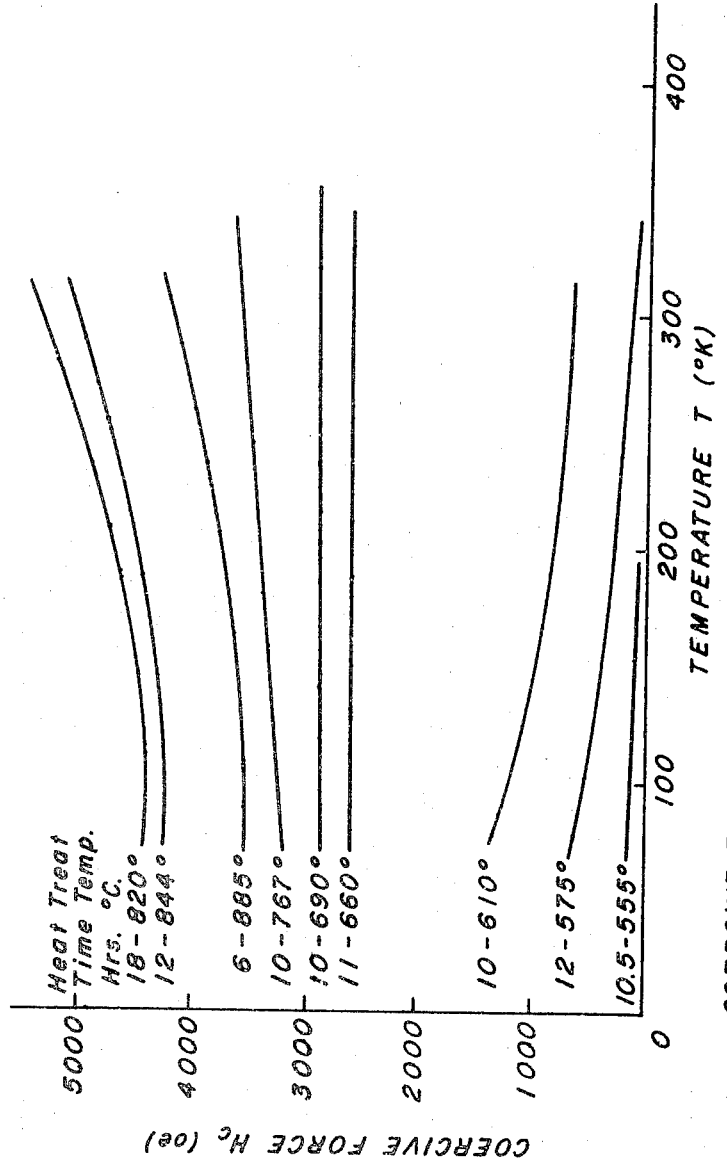

PRODUCTION OF BARIUM FERRITE

This invention relates to the production of barium ferrite of hard magnetic quality.

Barium ferrite ($BaFe_{12}O_{19}$) magnetic materials are well known and have been used for various purposes where hard magnetic properties are needed, for instance for making rubber magnets. Barium ferrite has commonly been made by solid state reaction of barium carbonate ($BaCO_3$) and ferric oxide ($Fe_2O_3$). Although the ferrite may be produced in this way, the procedure is attended by undesirable factors. That is, the particle size cannot ordinarily be well controlled whereby some particles are larger or smaller than the optimum range of particle size for maximum magnetic quality. Also, the particles produced by solid state reaction may tend to form large agglomerates which would have to be broken up by milling or grinding down the large multiple-domain particles, a procedure that would be objectionable in that it would both produce particles below the lower size limit, for instance below the superparamagnetic critical size, and also, would have a tendency to produce particles having objectionably large dislocations. Experience has shown that grinding or milling does not give a product of optimum particle size and optimum magnetic quality. It has been proposed also to make this ferrite by a coprecipitation and ignition technique (e.g., Mee et al., J. Appl. Phys. 34 (4), 1271 (1963), but as far as is known to me such practices have not been used in the commercial production of barium ferrite.

It is among the objects of this invention to provide a process of making barium ferrite by crystallization from glasses in the system $B_2O_3$, $BaO$, $Fe_2O_3$ Which produces good yields of nonagglomerated barium ferrite particles of optimum particle size and magnetic quality without grinding or milling, and in which the barium ferrite crystallizes from the glass over a wide range of temperatures.

A further object is to provide such a process in which barium ferrite is the only, or substantially only, magnetic phase produced, and which in the preferred embodiment is productive of barium ferrite of exceptionally high intrinsic coercive force (Hci).

Still another object is to apply the glass-ceramic process to the making of barium ferrite in the form of single crystal platelets in the particle size region possessing the optimum magnetic properties.

Yet another object is to provide such a process in which the crystallized barium ferrite is easily and simply separated from nonmagnetic phases.

Other objects will be understood from the following specification.

The invention will be described with reference to the accompanying drawings in which FIG. 1 is a triangular diagram representing the system $B_2O_3$–$BaO$–$Fe_2OB3$; and FIG. 2 illustrates, with reference to the preferred embodiment of the invention, the coercive force as a function of temperature for glasses crystallized during the times and at the temperatures shown in the drawing.

The invention is predicated upon my discovery that barium ferrite can be made, in accordance with the objects of the invention, by the application of the glass-ceramic technique to a restricted portion of the system of FIG. 1. More particularly, a substantially homogeneous and substantially noncrystalline glass is made within the area ABCD, and most suitably within the portion AEFD, of FIG. 1. To this end the constituent oxides are heated to form a melt containing no undissolved materials, and the melt is quenched rapidly to produce a substantially homogeneous glass free, or substantially free, from undissolved oxides and crystalline material as determined by X-ray and by electron microscope.

Although not essential for all purposes, it is desirable that the quenched melt be in a glassy condition because in that way the coercive force can be studied as a function of particle size. That is, starting with such a glass and controlling the crystallite size by the temperature of heat treatment, it is possible to find the optimum size which will produce the highest value of coercive force.

The glass thus produced is heat treated to cause nucleation and crystallization of barium ferrite dispersed in a borate-rich matrix composed largely of barium metaborate ($BaB_2O_4$) and barium ferrate ($BaFeO_4$). The barium ferrite can be recovered easily from the matrix material by treatment with a weak acid, such as a 10 percent solution of acetic acid, or by magnetic separation.

Two controlling features are essential to successful practice of the invention: (1) the composition must be such as to produce the desired ferrite as the only magnetic phase present (in high yield for economic reasons), and (2) the molten composition is to be so rapidly chilled, or quenched, as to give a glass substantially free from unmelted materials and also free, or substantially free, of crystalline material, determined in the manner just stated.

In general, glasses within the area ABCD can be used to make barium ferrite in accordance with the invention. However, the best results are to be had with glasses in the restricted area AEFD. All of these glasses when heat treated crystallize barium ferrite. Compositions outside the area ABCD produce ferric oxide ($Fe_2O_3$) upon heat treatment. Some compositions outside the area ABCD may crystallize both ferric oxide and barium ferrite but these are unsuited to magnetic uses, because the iron oxide present dilutes the barium ferrite and introduces an unknown and unwanted magnetic quality. It is characteristic of this invention that iron oxides are not present in the heat treated products of the area ABCD. Some compositions within the restricted area EBCF may devitrify to some extent on cooling but even so the heat treated products are composed of barium ferrite with nonmagnetic phases.

As indicated above, it is essential that the melts be quenched so rapidly as to produce glasses of the characteristics identified hereinbefore because casting of the melts onto metal plates or in metal molds produces crystalline materials that do not suffice for the purposes of the invention. I have found, however, that glasses of the desired characteristics may be formed by pouring the melt between two metallic rollers that solidify the melt to a very thin ribbon, suitable of the order of 0.1 mm. thick. The high surface area to volume ratio thus provided effects the necessary rapid quenching, and avoids devitrification while forming glasses free from crystalline material.

The quenched glasses are now ready for heat treatment. The heat treatment consists in heating the glasses to a temperature and for a time to cause nucleation and crystallization of the barium ferrite. The time and temperature needed for this purpose will depend, as will be understood, upon the particular composition being treated and the particle size desired in the product, which will in turn have a bearing upon its coercive force. This heat treatment may be carried out in air. My experience has shown that the compositions within the stated areas are productive of useful properties if heat treated between 660° and 885 °C. It may be said that the particle size tends to increase with increasing temperature.

As exemplifying the invention, reference may be made to a glass made from, in molar proportions, 26.5 percent of $B_2O_3$, 40.5 percent of $BaO$, and 33 percent of $Fe_2O_3$. This composition crystallizes barium ferrite in the range from 500° to 900° C. FIG. 2 represents the coercive forces at various temperatures developed by the barium ferrite of the composition just stated when produced by crystallization from the glass at the temperatures indicated in connection with each curve. With this glass heated at 820° C. for 18 hours an intrinsic coercive force of 5,350 Oe. was measured, which is the highest value of coercive force ever reported for an isotropic assembly of barium ferrite particles.

Although in general the compositions productive of barium ferrite in accordance with the invention may be satisfactorily crystallized in the range from 500° to 800° C., some compositions lying at or toward the line FD of FIG. 1 may crystallize barium ferrite only at higher temperatures; thus, a glass made from, in molar proportions, 15 percent of $B_2O_3$, 47.5 percent of $BaO$ and 37.5 percent of $Fe_2O_3$ crystallizes the ferrite only at 800° to 900° C.; such a situation is not necessarily objectionable because crystallization at such temperatures may give a particle size providing optimum magnetic properties for some purposes.

Compositions in the area EBCF may tend to devitrify upon quenching but upon heat treatment they produce barium ferrite and nonmagnetic phases and thus may be useful for some purposes.

Referring further to FIG. 2, it will be seen that this glass when heated at 660° and 690° C. resulted in a temperature independent Hc, about 2,600 to 2,900 Oe. Also, after this glass was heated 18 hours at 820° C. its Hc was 5,350, the highest value reported for barium ferrite.

Compositions outside the area of this invention do not produce useful magnetic products because even in cases where this ferrite was crystallized its Hc after heat treatment was too low to have practical value.

Although the invention has been described with reference to the production of the glasses from their oxides, it will be understood that the constituent oxides may be supplied by compositions containing compounds of boron, barium or iron that are productive of the oxides at the glassmaking temperatures needed provided their reaction or decomposition products do not contribute objectionable impurities to the ultimate glass. Thus the glasses may be made from ferric oxide, barium carbonate and boric acid with $H_2O$ and $CO_2$ being evolved during melting.

The nonmagnetic phases produced are readily separated from the ferrite, as indicated above, and may be tolerated in any event where their diluting effect is not objectionable. Barium ferrate is not magnetic above 176° C., and at any rate it virtually disappears at glass heat treatment temperatures above 767° C.

I claim:

1. That method of making barium ferrite comprising the steps of forming a homogeneous melt of $B_2O_3$, BaO and $Fe_2O_3$ in the area ABCD of FIG. 1, quenching the melt to a homogeneous glass substantially free from undissolved and crystalline materials, and heating the glass to nucleate and crystallize barium ferrite in a borate-rich matrix.

2. A method according to claim 1, the composition of said melt being within the area EBCF of FIG. 1.

3. A method according to claim 1, in which the barium ferrite is separated from the matrix material.

4. A method according to claim 1 in which the crystallization product is treated with a weak acid to dissolve the borate-rich material from the crystallized barium ferrite.

5. A method according to claim 4, said acid being acetic acid.

6. A method according to claim 1 in which the glass is heated between 660° and 885° C.

7. A method according to claim 1 in which the melt is quenched rapidly by passing it between metallic rollers to solidify the melt to a ribbon of the order 0.1 mm. thickness.

* * * * *